(12) United States Patent
Alekseev et al.

(10) Patent No.: US 8,826,995 B2
(45) Date of Patent: Sep. 9, 2014

(54) TRANSPORT METHOD, TRANSPORT MIXTURE AND TRANSPORT SYSTEM FOR THE PRESSURISED TRANSPORT OF CARBON DIOXIDE AND USE OF A TREATMENT MIXTURE

(75) Inventors: Alexander Alekseev, Wolfratshausen (DE); Ramachandran Krishnamurthy, Chestnut Ridge, NY (US); Guillermo Locht, Edomex (MX)

(73) Assignee: Linde Aktiengesellschaft, Munich (DE)

( * ) Notice: Subject to any disclaimer, the term of this patent is extended or adjusted under 35 U.S.C. 154(b) by 547 days.

(21) Appl. No.: 13/214,587

(22) Filed: Aug. 22, 2011

(65) Prior Publication Data

US 2013/0048080 A1 Feb. 28, 2013

(51) Int. Cl.
*F17D 1/02* (2006.01)
*C09K 8/594* (2006.01)

(52) U.S. Cl.
CPC .. *C09K 8/594* (2013.01); *F17D 1/02* (2013.01)
USPC .......................................... 166/402; 252/373

(58) Field of Classification Search
CPC ................................ C09K 8/594; F17D 1/02

USPC .............. 137/13; 166/402; 252/374, 375, 373
See application file for complete search history.

(56) References Cited

U.S. PATENT DOCUMENTS

| 4,344,486 A * | 8/1982 | Parrish ........................ 166/272.1 |
| 5,233,837 A * | 8/1993 | Callahan ......................... 62/621 |
| 2008/0176174 A1 * | 7/2008 | White et al. ...................... 431/5 |

FOREIGN PATENT DOCUMENTS

| DE | 10 2009 038 444 A1 | 4/2010 |
| DE | 10 2009 038 445 A1 | 4/2010 |

* cited by examiner

*Primary Examiner* — Craig Schneider
(74) *Attorney, Agent, or Firm* — Philip H. Von Neida

(57) ABSTRACT

A method for the transport of carbon dioxide from a feed means to a removal means in a pressure pipe, which method includes the production of a transport mixture containing up to 80 mol % carbon dioxide and an inert gas, in particular nitrogen, in the feed means, the pressurised feeding of the transport mixture into the pressure pipe, and the pressurised transport of the transport mixture in the pressure pipe to the removal means.

10 Claims, 1 Drawing Sheet

TRANSPORT METHOD, TRANSPORT MIXTURE AND TRANSPORT SYSTEM FOR THE PRESSURISED TRANSPORT OF CARBON DIOXIDE AND USE OF A TREATMENT MIXTURE

BACKGROUND OF THE INVENTION

The present invention relates to a transport method for the pressurised transport of carbon dioxide, a corresponding transport mixture, the use of such a transport mixture, and a corresponding transport system The transport of carbon dioxide under pressure, for example in appropriate pressure pipes, is becoming increasingly important, inter alfa owing to new technologies.

As is known to the applicant, for example from DE 10 2009 038 444 A1 and DE 10 2009 038 445 A1, which discuss the topic in detail, carbon dioxide is used for enhanced oil recovery (EOR) within the scope of tertiary crude oil extraction. In this instance, different fluids are injected under pressure and using suitable lines into or around the relevant deposit in order to extract even crude oil fractions which are dense, viscous and/or retained in layers of rock or earth owing to a capillary effect. Gaseous carbon dioxide mixes with the crude oil to be extracted and reduces the viscosity thereof. Transport is thus facilitated.

A similar field of application of carbon dioxide lies in the extraction of methane, such as coal bed methane (CBM), i.e. methane bound adsorptively in untouched carbon deposits having a methane content of more than 90%. In this case carbon dioxide is used within the scope of enhanced CBM recovery, wherein it is likewise injected into corresponding deposits. Carbon dioxide can also be used accordingly for improved extraction of oil shales.

The term "carbon capture and storage" (CCS) encompasses technologies which are intended to contribute to reducing the amount of greenhouse-relevant carbon dioxide present in the atmosphere. The carbon dioxide accumulating in large amounts during combustion processes in fossil-fired power stations and separated accordingly has to be transported as efficiently and safely as possible to suitable storage deposits, for example saline aquifers or disused crude oil deposits. Carbon dioxide can also be converted into biomass, for example biofuels, by microalgae.

Further options for use of carbon dioxide, for example for different chemical processes for the production of fuels, methanol, urea and the like, have long been known.

Carbon dioxide is normally transported in pressure pipes above its critical point (T, P), i.e. in the 'dense' phase. In the dense phase carbon dioxide behaves as a compressible fluid and has a density of approximately 900 kg/m$^3$. In order to reach the dense phase, the pressure must lie above approximately 70 bar (g). An unavoidable loss of pressure in a pressure pipe has to be compensated for by a corresponding compressor at the feed point.

As explained, for example, in the article "Dynamic simulation of a carbon dioxide transfer pipeline for analysis of normal operation and failure modes" by S. Liljemark et al., Energy Procedia 4 (2011) 3040-3047, the transport of carbon dioxide in this form poses a series of risks.

The main risk lies in the formation of a gas phase in the pipeline owing to pressure losses and/or a rise in temperature. Cavitation and/or pressure surges may thus occur and could lead to noise and vibrations. This leads to increased wear and, in extreme cases, to failure. The formation of a gas phase may occur in particular under changing conditions, such as during the filling of a pressure pipe, a change in load and/or a starting up or shutdown of a corresponding system and/or of a compressor. The damage could affect merely the pipeline itself, but could also spread to valves, flow rate measurement devices and other devices.

There is thus a need for a safer, more reliable and more economic transport of carbon dioxide, in particular in pressure pipes.

SUMMARY OF THE INVENTION

On this basis, the present invention proposes a transport method for the pressurised transport of carbon dioxide, a corresponding transport mixture, the use of such a transport mixture, and a corresponding transport system having the features of the independent claims. Preferred embodiments are dealt with in the dependent claims and in the description below.

BRIEF DESCRIPTION OF THE DRAWINGS

In the drawings, elements corresponding to one another are denoted by like reference numerals. For reasons of clarity, the descriptions of the elements will not be repeated.

DETAILED DESCRIPTION OF THE INVENTION

Figure 1:
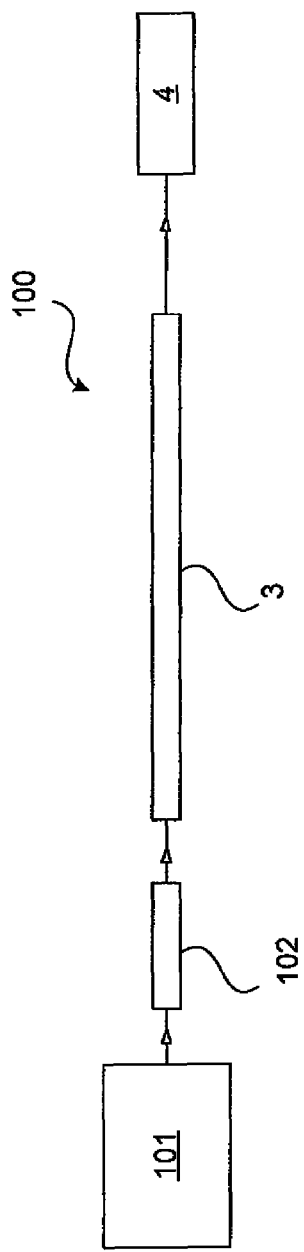
FIG. 1 shows a transport method for the pressurised transport of carbon dioxide according to the prior art.

In accordance with the invention a method for the transport of carbon dioxide from a feed means to a removal means in a pressure pipe is proposed, which method includes the production of a transport mixture containing less than 80 mol % carbon dioxide and an inert gas, in particular nitrogen, in the feed means. The accordingly produced transport mixture is then fed under pressure into the pressure pipe and is transported in the pressure pipe, under pressure, to the removal means.

Owing to the addition, proposed in accordance with the invention, of an inert gas before the pressurised transport of carbon dioxide and the associated reduction in the carbon dioxide content to less than 80 mol %, the critical temperature is significantly reduced compared to pure carbon dioxide. The likelihood that the mixture will form a gas phase with a fall in pressure and/or a rise in temperature is thus reduced significantly. The aforementioned drawbacks such as possible damage to pipelines, valves, flow rate measurement devices and other devices are thus likewise reduced significantly. Overall, the reliability and availability of a corresponding pipeline is increased considerably.

The critical point of pure carbon dioxide lies at approximately 31° C. and 74 bar. Even if only 10 mol % nitrogen is mixed in, the critical temperature is reduced to approximately 24° C. and the critical pressure rises to 88 bar. A transport mixture containing 80 mol % carbon dioxide and 20 mol % nitrogen has a critical temperature of only approximately 15° C. and a critical pressure of 105 bar. Such operational limits can be observed much more reliably.

Advantageous transport mixtures comprise, for example, less than 80 mol %, less than 75 mol %, less than 70 mol %, less than 65 mol %, less than 60 mol %, less than 55 mol %, less than 50 mol %, less than 45 mol % or less than 40 mol % carbon dioxide. Advantageous contents may also lie within specific ranges, the aforementioned contents possibly representing upper limits and the lower limits of corresponding ranges possibly lying, for example, at 20 mol %, 25 mol %, 30 mol %, 35 mol %, 40 mol %, 45 mol %, 50 mol %, 55 mol %, 60 mol %, 65 mol %, 70 mol % or 75 mol % respectively. Corresponding contents are adapted to present and/or expected transport conditions in each case, as described in greater detail below.

Advantageous mixtures are formed of carbon dioxide and nitrogen. Nitrogen can be produced in a particularly cost-effective manner and, since it can be produced from ambient air, is always available in large amounts. In the case of enhanced oil recovery, carbon dioxide results in an improved oil yield. The contents of a corresponding mixture can thus be adjusted (also) on the basis of its desired property and under consideration of cost aspects. A transport mixture advantageously contains less than 80 mol % carbon dioxide and up to 5 mol % tolerable impurities, in particular methane and argon, with the rest being formed of nitrogen. Impure nitrogen may likewise be used. It is known that impurities in multi-component carbon dioxide mixtures vary widely as a function of the respective sources. Generally, carbon dioxide fractions obtained from separators of power stations contain, for example, residual contents of sulphur dioxide, hydrogen sulphide and oxygen. Similarly to free water, these should be reduced to a minimum. Other gases, for example nitrogen oxide, methane, argon and hydrogen can be tolerated to a certain extent.

The (maximum) carbon dioxide content x is advantageously calculated, in mol %, in an advantageous transport mixture as follows:

$$x = 58 \cdot \exp(0.018 \cdot t) \pm 5 \text{ mol \%}$$

where t is a working or ambient temperature in ° C. The equation defines the maximum content of carbon dioxide on the basis of the dew point temperature of the mixture and taking into account a corresponding safety range. By obtaining corresponding carbon dioxide contents, safer transport can be ensured under consideration of the ambient temperature, without sacrificing an excessive reduction of the carbon dioxide content. Adaptation to the present and/or expected transport conditions is thus possible in each case.

The following table shows maximum carbon dioxide concentrations at ambient temperatures of −20° C. to +20° C., which were based on the equation given above.

| Ambient temperature | Concentration |
|---|---|
| −20° C. | 40.5 ± 5 mol % |
| −15° C. | 44.3 ± 5 mol % |
| −10° C. | 48.4 ± 5 mol % |
| −5° C. | 53.0 ± 5 mol % |
| 0° C. | 58.0 ± 5 mol % |
| 5° C. | 63.5 ± 5 mol % |
| 10° C. | 69.4 ± 5 mol % |
| 15° C. | 76.0 ± 5 mol % |
| 20° C. | 83.1 ± 5 mol % |

As can clearly be seen, a concentration of 80 mol % or less allows sufficiently safe transport at a temperature of 15 to 20° C. Such temperatures prevail at all usage sites of corresponding plants, at least temporarily and in desert regions, for example at night. At lower temperatures, for example in the arctic or in seawater (in "offshore" plants), correspondingly lower values are to be observed. The maximum concentration is independent of pressure, i.e. the pressure in the corresponding pressure pipe is freely selectable.

If greater carbon dioxide contents, as are present in a corresponding transport mixture, are required at a removal means, a method may advantageously also include the removal of components of the transport mixture after the pressurised transport. Suitable means are advantageously provided for this purpose. In particular, in this regard membrane separators (with lower amounts of carbon dioxide to be processed) or auto-refrigerated cycles can be used. In the latter case, a corresponding mixture or some of said mixture is cooled in a heat exchanger until it is liquefied in part. A nitrogen-containing vapour is separated in a separator, fed to the heat exchanger in counterflow and heated, whereas the fluid rich in carbon dioxide is throttled slightly (auto-refrigeration) and likewise guided through the heat exchanger. The hotter nitrogen flow can be depressurised in one or more turbines until it reaches atmospheric pressure. The cold flow at the outlet of the aforementioned turbine(s) can likewise be guided through the heat exchanger, and the energy generated in the turbine is used to further compress the flow containing carbon dioxide.

With regard to the transport mixture according to the invention, the use of the transport mixture according to the invention and the transport system provided in this regard, reference is made expressly to the features and advantages described above.

The invention is illustrated schematically in the drawings on the basis of an embodiment and will be described hereinafter with reference to the drawings.

FIG. 1 shows a schematic illustration of a transport method for the pressurised transport of carbon dioxide according to the prior art, denoted as a whole by 100.

According to the prior art carbon dioxide 102 is provided in a feed means 101, for example a carbon dioxide separator, of a fossil-fired power station. The carbon dioxide 102 contains specific residual contents of impurities, which cannot be separated completely by the feed means 101. For example, the carbon dioxide 102 may contain residual contents of 5 mol % or less of the aforementioned impurities, such as hydrogen sulphide, sulphur dioxide, etc.

The carbon dioxide 102 is already pressurised by a transport pressure or passes through a corresponding compressor before it is fed into a pressure pipe 3. Via the pressure pipe 3, the carbon dioxide is fed under pressure to a removal means 4, which for example is formed as part of a means, described above, for crude oil and/or natural gas recovery, a means for extracting biomass, a system for compressing carbon dioxide, or a synthesis reactor.

In other words, in accordance with the prior art carbon dioxide 102 is transported in the pressure pipe 3 in largely pure form (irrespective of corresponding impurities), more specifically in the 'dense' state, described previously, above the critical point.

Figure 2:
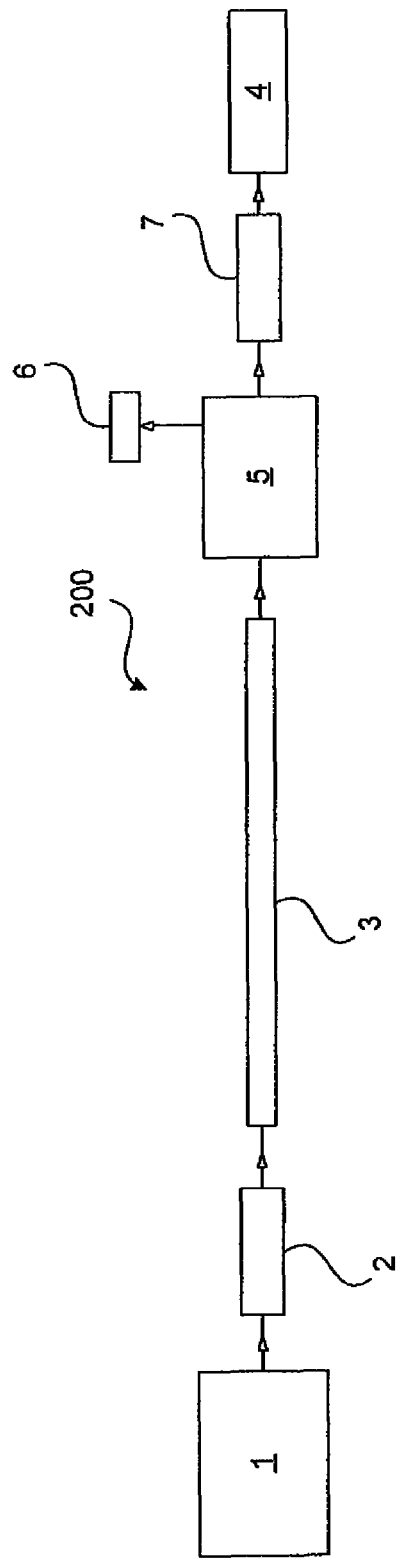
FIG. 2 shows a transport method for the pressurised transport of carbon dioxide according to a particularly preferred embodiment of the invention.

FIG. 2 shows a transport method for the pressurised transport of carbon dioxide in accordance with a particularly preferred embodiment of the invention, denoted as a whole by 200.

A feed means 1 is also used within the scope of the advantageous method 200. In contrast to the feed means 101 of FIG. 1, however, (largely) pure carbon dioxide 102 is not provided through the feed means 1, but instead a carbon dioxide transport mixture 2. As explained, the carbon dioxide transport mixture 2 advantageously contains up to 80 mol % carbon dioxide and a smaller fraction of tolerable impurities, in particular methane and argon, with the rest being formed by nitrogen.

As described above with reference to FIG. 1, the carbon dioxide transport mixture 2 is or will be pressurised and transported to a removal means 4 via a pressure pipe 3.

Further devices may (optionally) be arranged upstream of the removal means 4. These devices are provided if a higher carbon dioxide content than that contained in the transport mixture 2 is necessary in the removal means 4. For this purpose a separation device 5 is provided which separates (unwanted) components 6 from the transport mixture 2. The accordingly purified transport mixture 7 is fed to the removal means 4.

LIST OF REFERENCE NUMERALS

1 feed means
2 transport mixture
3 pressure pipe
4 removal means
5 separation means
6 components of the transport mixture
7 purified transport mixture
100, 200 transport method
101 feed means
102 carbon dioxide

We claim:

1. A method for the transport of carbon dioxide from a feed means to a removal means in a pressure pipe, which method includes the production of a transport mixture having a carbon dioxide content x, in mol % dependent on a temperature t in ° C., wherein $x=58 \cdot \exp(0.018 \cdot t) \pm 5$ mol % and an inert gas in the feed means the pressurised feeding of the transport mixture into the pressure pipe, and the pressurised transport of the transport mixture in the pressure pipe to the removal means.

2. The method as claimed in claim 1 wherein said inert gas is nitrogen.

3. The method as claimed in claim 1, wherein a transport mixture is produced which contains less than 80 mol % carbon dioxide and up to 5 mol % tolerable impurities, the rest being formed of nitrogen.

4. The method as claimed in claim 3 wherein said tolerable impurities are selected from the group consisting of methane and argon.

5. The method as claimed in claim 1, further comprising the removal of components of the transport mixture after the pressurised transport.

6. A transport mixture for the transport of carbon dioxide having carbon dioxide content x, in mol %, dependent on a temperature t in ° C., wherein $x=58 \cdot \exp(0.018 \cdot t) \pm 5$ mol % and an inert gas.

7. The transport mixture as claimed in claim 6 wherein said inert gas is nitrogen.

8. The transport mixture as claimed in claim 6, which contains less than 80 mol % carbon dioxide and up to 5 mol % tolerable impurities, the rest being formed of nitrogen.

9. The transport mixture as claimed in claim 8 wherein said tolerable impurities are selected from the group consisting of methane and argon.

10. The transport mixture as claimed in claim 8 which is used in a process selected from the group consisting of enhanced oil recovery, chemical processes and the production of fuels, methanol and urea.

\* \* \* \* \*